United States Patent
Lukens et al.

(10) Patent No.: US 10,831,299 B1
(45) Date of Patent: Nov. 10, 2020

(54) FORCE-SENSING BUTTON FOR ELECTRONIC DEVICES

(71) Applicant: Apple Inc., Cupertino, CA (US)

(72) Inventors: William C. Lukens, San Francisco, CA (US); Adam T. Clavelle, San Francisco, CA (US); Steven P. Cardinali, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/792,601

(22) Filed: Oct. 24, 2017

Related U.S. Application Data

(60) Provisional application No. 62/546,387, filed on Aug. 16, 2017.

(51) Int. Cl.
G06F 3/041 (2006.01)
G06F 3/01 (2006.01)

(52) U.S. Cl.
CPC ............ *G06F 3/0414* (2013.01); *G06F 3/016* (2013.01); *G06F 3/0412* (2013.01); *G06F 3/0416* (2013.01); *G06F 2203/04105* (2013.01)

(58) Field of Classification Search
CPC .... G06F 3/0414; G06F 3/0416; G06F 3/0412; G06F 3/016; G06F 2203/04105; G06F 1/1662; G06F 1/1656; G06F 1/1671; H04M 1/18; H04M 1/23; H01H 13/06; H01H 2231/022; H01H 13/023; H01H 13/705; H01H 13/83; H01H 13/52; H01H 2205/016; H01H 2011/0087; H01H 2231/002; H01H 2219/062; H01H 2221/05; H01H 2223/002; H01H 2227/016; H01H 2227/026; H01H 2227/036; H01H 2229/02; H01H 2229/028; H01H 2229/036; H05K 5/062
See application file for complete search history.

(56) References Cited

U.S. PATENT DOCUMENTS

| | | |
|---|---|---|
| 2,866,141 A | 12/1958 | Frank et al. |
| 4,037,068 A | 7/1977 | Gaynor |
| 4,258,096 A | 3/1981 | LaMarche |
| 4,324,956 A | 4/1982 | Sakakino et al. |
| 4,345,119 A | 8/1982 | Latasiewicz |
| 4,581,509 A | 4/1986 | Sanford et al. |
| 4,922,070 A | 5/1990 | Dorkinski |
| 5,258,592 A | 11/1993 | Nishikawa et al. |
| 5,584,380 A | 12/1996 | Naitou |
| 5,657,012 A | 8/1997 | Tait |

(Continued)

FOREIGN PATENT DOCUMENTS

| | | |
|---|---|---|
| EP | 2720129 | 4/2014 |
| JP | 3034908 | 3/1997 |
| KR | 20080045397 | 5/2008 |

*Primary Examiner* — Vinh T Lam
(74) *Attorney, Agent, or Firm* — Brownstein Hyatt Farber Schreck, LLP

(57) ABSTRACT

An input device for an electronic device includes one or more pressure sensors for detecting inputs. In one embodiment, a pressure sensor is operably coupled to a compression chamber and configured to detect changes in pressure in the compression chamber. The changes in pressure in the compression chamber may be registered as inputs by the electronic device. The pressure sensor may be located next to, instead of below, the input member, and therefore, the thickness of the button assembly can be reduced compared to conventional designs.

20 Claims, 21 Drawing Sheets

(56) References Cited

U.S. PATENT DOCUMENTS

| | | |
|---|---|---|
| 6,344,791 B1 | 2/2002 | Armstrong |
| 6,355,891 B1 | 3/2002 | Ikunami |
| 6,525,278 B2 | 2/2003 | Villain et al. |
| 6,963,039 B1 | 11/2005 | Weng et al. |
| 7,119,289 B2 | 10/2006 | Lacroix |
| 7,388,167 B2 | 6/2008 | Liao et al. |
| 8,167,126 B2 | 5/2012 | Stiehl |
| 8,248,815 B2 | 8/2012 | Yang et al. |
| 8,263,886 B2 | 9/2012 | Lin et al. |
| 8,263,889 B2 | 9/2012 | Takahashi et al. |
| 8,432,368 B2 | 4/2013 | Momeyer et al. |
| 8,446,713 B2 | 5/2013 | Lai |
| 8,576,044 B2 | 11/2013 | Chapman |
| 8,648,829 B2 | 2/2014 | Shahoian et al. |
| 8,885,856 B2 | 11/2014 | Sacha |
| 9,058,941 B2 | 6/2015 | Malek et al. |
| 9,064,654 B2 | 6/2015 | Whitt et al. |
| 9,089,049 B2 | 7/2015 | Perrault et al. |
| 9,263,204 B2 * | 2/2016 | Rivera .................. G06F 1/1626 |
| 9,449,770 B2 | 9/2016 | Sanford et al. |
| 9,510,468 B2 | 11/2016 | Schack et al. |
| 9,620,312 B2 * | 4/2017 | Ely ........................ G06F 1/163 |
| 9,871,330 B2 | 1/2018 | Seo et al. |
| 9,916,942 B2 | 2/2018 | Shedletsky |
| 9,949,395 B2 | 4/2018 | Jung et al. |
| 10,002,731 B2 | 6/2018 | Wang et al. |
| 10,018,966 B2 | 7/2018 | Ely et al. |
| 2004/0082414 A1 | 4/2004 | Knox |
| 2007/0152959 A1 * | 7/2007 | Peters .................. G06F 3/0489 345/156 |
| 2008/0049980 A1 * | 2/2008 | Castaneda .......... G06K 9/00013 382/115 |
| 2009/0312051 A1 * | 12/2009 | Hansson ........... H04M 1/72522 455/556.1 |
| 2012/0067711 A1 | 3/2012 | Yang |
| 2013/0037396 A1 | 2/2013 | Yu |
| 2013/0087443 A1 | 4/2013 | Kikuchi |
| 2015/0041289 A1 * | 2/2015 | Ely ........................ G06F 1/163 200/4 |
| 2015/0199011 A1 * | 7/2015 | Fukumoto ............. G06F 3/0488 345/173 |
| 2015/0221460 A1 * | 8/2015 | Teplitxky ............... H01H 13/06 200/302.2 |
| 2016/0058375 A1 * | 3/2016 | Rothkopf ................ G06F 3/015 600/301 |
| 2017/0069443 A1 | 3/2017 | Wang et al. |
| 2017/0069444 A1 * | 3/2017 | Wang .................. H01H 13/023 |
| 2017/0351349 A1 * | 12/2017 | Fassett ...................... G01L 7/02 |
| 2018/0005496 A1 * | 1/2018 | Dogiamis .............. G04G 21/00 |
| 2018/0081400 A1 * | 3/2018 | Pandya .................. G06F 3/041 |
| 2018/0307361 A1 * | 10/2018 | Park ...................... G06F 3/0416 |

* cited by examiner

DETAIL 1-1

FORCE-SENSING BUTTON FOR ELECTRONIC DEVICES

CROSS-REFERENCE TO RELATED APPLICATION

This application is a non-provisional patent application of and claims the benefit of U.S. Provisional Patent Application No. 62/546,387, filed Aug. 16, 2017 and titled "Force-Sensing Button for Electronic Devices," the disclosure of which is hereby incorporated herein by reference in its entirety.

FIELD

Embodiments described herein relate to electronic devices, and in particular, to electronic devices that incorporate a button that includes a pressure sensor for detecting inputs.

BACKGROUND

Many traditional electronic devices include buttons, keys, or other similar input mechanisms. Many traditional buttons require a switch or sensor to be placed directly below an input surface, often on an axis of movement of the button. This increases the size of the button, and may increase the size of the electronic device that includes the button. In many cases, it is advantageous to minimize the size of the button and the electronic device that includes the button. The embodiments described herein are directed to electronic devices having a button or input device that may address these and other issues that are associated with some traditional input mechanisms.

SUMMARY

Certain embodiments described herein relate to, include, or take the form of an electronic device that includes a device housing, a display, and a button assembly. The display is coupled to the device housing and configured to display a graphical output. The button assembly is at least partially disposed in the device housing. The button assembly includes an input member configured to move in response to receiving an input. The button assembly further includes a compression chamber and a pressure sensor operably coupled to the compression chamber. Movement of the input member changes the volume of the compression chamber, thereby changing a pressure in the compression chamber. The pressure sensor is configured to output a signal in response to the pressure changing in the compression chamber. The signal causes the graphical output of the display to change.

Other embodiments described generally reference a button assembly that includes a button housing defining an opening, an input member, and a shaft coupled to the input member and extending through the opening. The button assembly further includes a seal positioned in the opening and compressed between the shaft and a surface of the button housing. The button assembly further includes a compression chamber coupled to the opening and having a volume. The button assembly further includes a pressure sensor coupled to the compression chamber and configured to detect a change in a pressure of the compression chamber in response to movement of the shaft.

Still further embodiments described herein generally reference a method for detecting an input at a button of an electronic device. The method includes the steps of detecting a pressure change in a compression chamber of the button and determining that a magnitude of the pressure change exceeds a first determined threshold. The method further includes determining, in response to determining that the magnitude of the pressure change exceeds the first determined threshold, whether a rate of the pressure change exceeds a second determined threshold. The method further includes registering, in response to determining that the rate of the pressure change exceeds the second determined threshold, an input at the electronic device.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
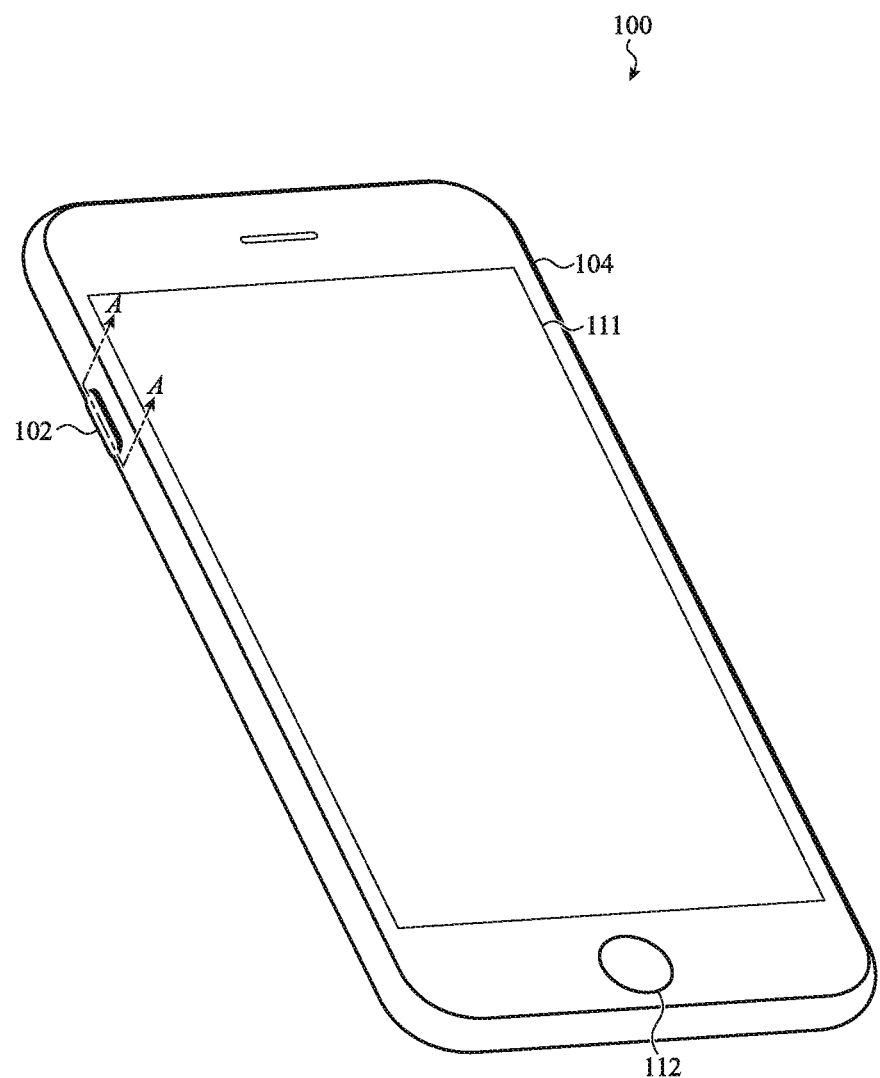
FIG. 1A illustrates an example electronic device that may incorporate a button assembly according to one or more embodiments presented herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

The embodiments disclosed herein are directed to an input device for use as part of, or with, an electronic device. An electronic device receives inputs from users manipulating the input device. The input device may include one or more pressure sensors for detecting forces applied to the input device; such forces may be interpreted as inputs by the associated electronic device. In various embodiments, the pressure sensors detect inputs by measuring a pressure change in a compression chamber. The force-sensing input device may be configured to control or otherwise provide inputs to the electronic device. In various embodiments, the force-sensing input device may be used to control a visual or graphical output of a display of the electronic device. A force-sensing input device may be configured, for example, as a power button, a key of a keyboard, a control button (e.g., volume control), a home button, a watch crown, a joystick, a trackpad, and so on.

Some forms of input devices use a switch or other type of sensor positioned below the device, for example along an axis of movement of a button to generate an input. This may increase the size (e.g., thickness) of the input device, thereby occupying more space within an electronic device housing. In some embodiments, the electronic device housing must be enlarged (e.g., made thicker) to accommodate such input devices.

By contrast, some button assemblies described herein include one or more pressure sensors configured to detect inputs at an input member. In various embodiments, a pressure sensor detects pressure changes in one or more compression chambers. The pressure changes may be interpreted by the electronic device as a force applied to the input device (e.g., an input to the electronic device). The compression chamber is a sealed volume configured to contain compressible contents such as air, other gases, liquids, and so on. The compression chamber has a volume that changes based on movement of an input member. When the compression chamber is sealed, a change in volume results in a change in pressure according to Boyle's law, which states that the pressure in a container containing a gas increases as the volume of the container decreases. For example, as the volume of the compression chamber decreases, the pressure in the compression chamber increases. Conversely, as the volume of the compression chamber increases, the pressure in the compression chamber decreases.

A pressure sensor is operably and physically coupled to the compression chamber and configured to detect changes in pressure in the compression chamber. Accordingly, when a user exerts a force (e.g., presses, pulls, and so on) on the input member, the pressure in the compression chamber changes, and the pressure sensor detects a change in pressure that may be interpreted as an input by the electronic device.

The pressure sensor may be located next to, instead of along an axis of motion of, the input member. Many conventional button sensors require that the sensor be placed below the input member, for example in a stack. The button assemblies described herein do not require such an arrangement, and therefore, the thickness of the button assembly can be reduced compared to conventional designs.

Pressure changes and/or pressure values detected by the pressure sensor may be used to detect inputs, or may be correlated to inputs, received at the button assembly. In one embodiment, if the magnitude of a pressure change exceeds or goes below a threshold, an input may be registered, for example by a processor of the electronic device. In another embodiment, if the absolute or differential pressure value is above or below a threshold, an input may be registered. In still other embodiments, a magnitude of a pressure change or pressure value may indicate whether an input occurs and/or a degree of measure of the input (e.g., a measure of a force applied to the input surface). In another embodiment, a range of inputs corresponds to a range of forces. In various embodiments, additional criteria, such as the timing and/or rates of pressure changes, may be used to register inputs.

In various embodiments, button assemblies may include multiple compression chambers and/or multiple pressure sensors. These may be used to determine additional information about an input, such as a location of an input on the input member, a tilt of an input member, a directional indication, and so on.

Additionally, button assemblies may include one or more reference chambers and/or reference pressure sensors to determine a differential pressure. A reference chamber is a sealed volume, which does not change volume in response to a force being applied at the input member. As such, it may be used as a basis of comparison to determine the pressure change in the compression chamber that is a result of the force being applied. The pressure in the reference chamber may change based on environmental factors, such as atmospheric pressure changes, temperature changes, and the like. As a result, a change in the pressure of the compression chamber relative to the pressure in the reference chamber is more likely to be a result of a force being applied to the input member than a change in the pressure of the compression chamber relative to atmospheric pressure. This may lead to more effective input detection.

The button assemblies described herein may include one or more valves configured to fluidly couple a compression chamber with one or more volumes (e.g., reference chambers, enclosed volumes, and/or the atmosphere). In various embodiments, valves may be used to equalize pressure between multiple chambers, between a chamber and the atmosphere, and so on. In another embodiment, the button assembly includes a pressure change actuator for changing the pressure in the compression chamber to provide a tactile output (e.g., feedback) through the input surface.

Detailed embodiments of these general considerations will now be disclosed in relation to the accompanying figures.

FIG. 1A illustrates an example electronic device 100 that may incorporate a button assembly 102, according to one or more embodiments presented herein. The electronic device 100 includes a device housing 104 and a button assembly 102 disposed in an opening of the device housing. The button assembly 102 includes an input surface on which inputs can be received. The electronic device 100 may additionally include a display 111 and one or more buttons 112.

The button assembly 102 may be disposed at any of several locations on (or in) the device housing 104. For example, the button assembly 102 may be positioned along a surface of the device housing 104 as depicted in FIG. 1A. Alternatively or additionally, the button assembly 102 may be positioned on a different surface or portion of an electronic device 100, such as a sidewall, a top surface, a bottom surface, and the like.

The button assembly 102 may be shaped in any of several geometries. For example, the button assembly 102 may be circular, oblong, or rectangular. In embodiments in which the button assembly 102 extends from the electronic device 100, the button assembly 102 may present a first geometry for a portion extending from the electronic device, and a second geometry for another portion contained within the device housing 104.

The electronic device 100 can also include one or more internal components (not shown) typical of a computing or electronic device, such as, for example, one or more processors, memory components, network interfaces, and so on. Furthermore, although the electronic device 100 is illustrated as a cellular phone, It should be appreciated that any number of electronic devices may incorporate a button assembly, including (but not limited to): a computer, a laptop computer, a tablet computer, a phone, a wearable device, a health monitoring device, a home or building automation device, a home or building appliance, a craft or vehicle entertainment, control, and/or information system, a navigation device, a personal digital assistant, a media player, a watch, another wearable device, a touch-sensitive device, a keypad, a keyboard, and so on.

The device housing 104 provides a device structure, defines an internal volume of the electronic device 100, and houses device components. In various embodiments, the device housing 104 may be constructed from any suitable material, including metals (e.g., aluminum, titanium, and the like), polymers, ceramics (e.g., glass, sapphire), and the like. In one embodiment, the device housing 104 is constructed from multiple materials. The device housing 104 can form an outer surface or partial outer surface and protective case for the internal components of the electronic device 100.

The display 111 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 111 provides a graphical output, for example associated with an operating system, user interface, and/or applications of the electronic device 100. In one embodiment, the display 111 includes one or more sensors and is configured as a touch-sensitive (e.g., single-touch, multi-touch) and/or force-sensitive display to receive inputs from a user. In various embodiments, a graphical output of the display 111 is responsive to inputs provided to the button assembly.

Figure 1B:
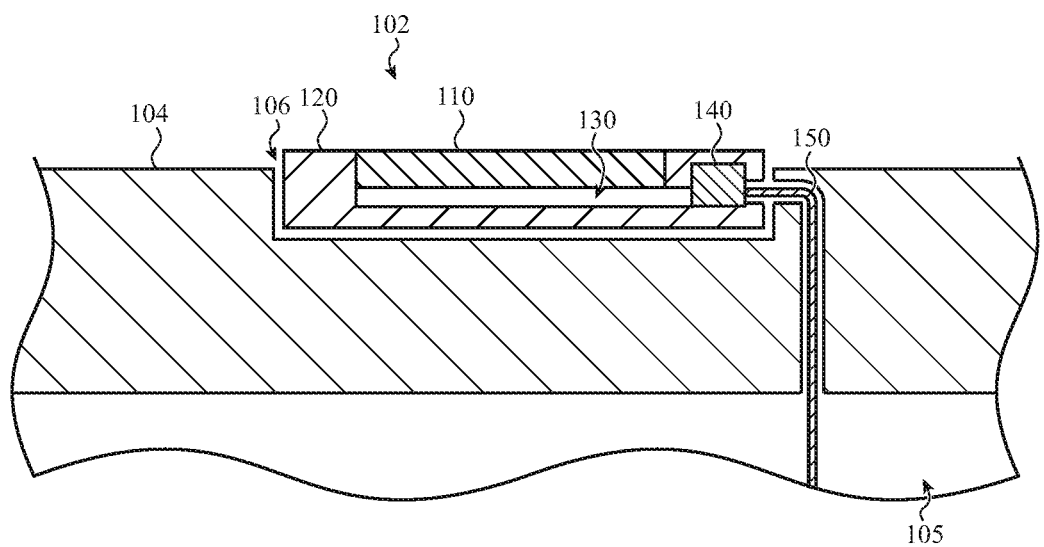
FIG. 1B is a cross-section of the button assembly of the electronic device taken through section line A-A of FIG. 1A.

FIG. 1B is a cross-section of the button assembly of the electronic device 100, taken through section line A-A of FIG. 1A. The button assembly 102 includes a button housing 120, an input member 110, a compression chamber 130, and a pressure sensor 140. The input member 110 is configured to receive inputs and translate, deflect, bend, or otherwise move or be displaced, relative to the button housing 120. The movement of the input member 110 changes a volume of the compression chamber 130. The compression chamber 130 is sealed such that, as the volume of the compression chamber 130 changes, the pressure in the contents of the compression chamber changes according to Boyle's law. The pressure sensor 140 is operably coupled to the compression chamber 130 and configured to detect changes in pressure in the compression chamber. Accordingly, when a user exerts a force (e.g., presses, pulls, and so on) on the input member 110, the pressure sensor 140 detects a change in pressure that may be interpreted as an input by the electronic device 100.

The compression chamber 130 is a sealed void configured to contain contents such as air, other gases, liquids, and so on. The compression chamber 130 has a volume that changes based on movement of the input member 110. As described above, when the compression chamber 130 is sealed, a change in volume results in a change in pressure. For example, as the volume of the compression chamber 130 decreases, the pressure in the compression chamber increases. Conversely, as the volume of the compression chamber 130 increases, the pressure in the compression chamber decreases.

In one embodiment, the compression chamber 130 is formed in the button housing 120 and/or the input member 110. In another embodiment, the compression chamber 130 is formed by one or more components of the electronic device 100 and/or the button assembly 102. For example, the compression chamber 130 may be formed between one or more surfaces of the button housing 120 and other components of the electronic device 100, such as a surface of the device housing 104, as described in more detail below with respect to FIGS. 11 and 12.

The pressure sensor 140 is operably and physically coupled to the compression chamber 130 and configured to output a signal in response to the pressure changing in the compression chamber 130. The signal that indicates a pressure change may be interpreted by the electronic device as an input (e.g., a force applied to the input member). The pressure sensor may be configured to measure pressure changes, absolute pressure and/or differential pressure. In various embodiments, the pressure sensor 140 may measure pressure and/or pressure changes using a variety of methods and techniques, including piezoresistive sensing, capacitive sensing, electromagnetic sensing, piezoelectric sensing, optical sensing, potentiometric sensing, and so on. In various embodiments, different pressure sensor outputs may correspond to different inputs. For example, an amount of a pressure change may correspond to a degree of measure of the input force (e.g., force detection). Similarly, different directions of pressure changes (e.g., pressure increases and pressure decreases) may correspond to different inputs.

As noted above, pressure changes and/or pressure values detected by the pressure sensor 140 may be used to detect inputs received at the button assembly 102. In one embodiment, if the magnitude of a pressure change exceeds or goes below a threshold, an input may be registered, for example by a processor of the electronic device 100. In another embodiment, if the absolute or differential pressure value is above or below a threshold, an input may be registered. In still other embodiments, a magnitude of a pressure change or pressure value may indicate whether an input occurs and/or a degree of measure of the input (e.g., a measure of a force applied to the input surface). In various embodiments, additional criteria, such as the timing and/or rates of pressure changes may be used to register inputs. This is discussed in more detail below with respect to FIG. 13.

As illustrated in FIG. 1B, the pressure sensor 140 may be located next to, instead of below, the input member 110. Many conventional button sensors require that the sensor be placed below the input member 110, for example in a stack. The button assemblies described herein do not require such an arrangement, and therefore, the thickness of the button assembly can be reduced compared to conventional designs.

In various embodiments, button assemblies 102 may include multiple compression chambers 130 and/or multiple pressure sensors 140, as discussed below with respect to FIGS. 4-5. Additionally, button assemblies 102 may include one or more reference chambers and/or reference pressure sensors to determine a differential pressure. This may lead to more effective input detection because the differential pressure can account for atmospheric temperature and pressure changes. This is discussed in more detail below with respect to FIGS. 2D and 3.

In one embodiment, the compression chamber 130 may include one or more valves configured to fluidly couple the compression chamber 130 with one or more volumes (e.g., reference chambers, enclosed volumes, and/or the atmosphere). The valve may be configured to equalize the pressure in the compression chamber 130 and the coupled volume when the valve is opened. In one embodiment, a valve is configured to fluidly couple the compression chamber 130 to the atmosphere when the valve is opened such that the pressure in the compression chamber 130 adjusts to atmospheric pressure. In another embodiment, the valve couples the compression chamber 130 to a reference chamber when it is opened such that the pressures between the reference chamber and the compression chamber are equalized. In other embodiments, the valve is configured to control the flow of fluid and/or can be closed prior to the pressures equalizing such that the pressures move toward equilibrium, but do not completely equalize. For example, a valve to the atmosphere may allow some air to exit the compression chamber 130, but may be closed before the compression chamber 130 reaches atmospheric pressure.

In one embodiment, the device housing 104 defines an enclosed volume 105, and may include a passage between the enclosed volume 105 and the opening 106 such that the button assembly 102 and additional components of the electronic device 100 may be physically coupled, for example by an electrical connector 150. For example, the pressure sensor 140 may be electrically connected to a processor of the electronic device 100 via the electrical connector 150. The electrical connector 150 is illustrated as a flex cable, but may be any suitable electrical connector for facilitating communication between the button assembly 102 and components of the electronic device 100, such as wire, cable, and the like. In one embodiment, the button assembly 102 and additional components of the electronic device 100 are coupled using a wireless connection.

In one embodiment, the input member 110 is configured to translate, for example up and down with respect to FIG. 1B, in response to inputs on the input surface. In other embodiments, the input member 110 may be configured to bend as a beam (e.g., a fixed-free beam or a fixed-fixed beam) attached to the button housing 120 or the device housing 104, and is configured to deflect or bend in response to user input. The input member 110 may also bend or deform as a diaphragm or flexible wall. In other embodiments, the input member 110 may be configured to twist or rotate.

In the example of FIG. 1B, the input member 110 is shown as a separate component that is attached to the button housing 120, but in various embodiments, the input member 110 may be integrated as an exterior surface of the button housing 120, or it may be a separate component disposed on, within, or outside of the button housing 120. In the case in which the input member 110 is integrated as an exterior surface of the button housing, the button housing may define the input surface. The input member 110 may comprise one or more layers. In one embodiment, an outer layer is a cap formed of a durable material such as sapphire, and the cap forms an exterior surface of the button housing 120.

The button housing 120 houses various button assembly components. In various embodiments, the button housing 120 is configured to be attached to or disposed in an opening 106 of the housing 104 of the electronic device. The button assembly 102 may be attached to the device housing 104 using a variety of methods, including fasteners (e.g., screws, bolts, clips, and so on), adhesives, welding, pressure fitting, and the like.

In various embodiments, the button assembly 102 is self-contained or modular. For example, as described above, the button assembly 102 may include a button housing 120 that houses various button assembly components and is configured to be attached to or disposed in the housing 104 of the electronic device. The modular nature of the button assembly provides several advantages. The button assembly 102 may be installed and removed easily. Further, the manufacturing process of an electronic device may be simplified because the button assembly 102 can be constructed separately from the rest of the device and installed in a relatively quick and simplified manner as compared to, for example, a traditional button assembly with components that are integrated into a device housing. The button assembly 102 may further be tested separately from the rest of the device, both during and after construction, which simplifies quality assurance and troubleshooting. The button assembly 102 may be removed from the assembly for testing and/or replacement, which may reduce device maintenance complexity and cost. The modular nature of the button assembly 102 also allows the button assembly and the housing 104 of the electronic device in which the button assembly is disposed to be sealed, thereby inhibiting the entry of moisture or contaminants into the device housing 104 and/or the button assembly.

In one embodiment, the button assembly 102 is configured to produce a tactile output. For example, the button assembly provides feedback in response to a sensed touch, to confirm an input, and so on. In one embodiment, the button assembly 102 includes a sensor, such as a touch sensor, a biometric sensor, a contact sensor, a capacitive sensor, or the like. For example, the button assembly may detect whether a user's finger, skin, or other object is contacting the input surface of the input member 110.

As shown in FIG. 1B, the button assembly 102 may be positioned to protrude from a surface of the device housing 104. Alternatively, the button assembly may be positioned such that it is flush with a surface of the device housing 104 to present a substantially planar input member relative to the surface of the electronic device. In yet another alternative, the button assembly may be positioned to be recessed in a surface of the device housing 104. Other configurations of the mounting of the button assembly are possible. For example, the exterior of the button assembly may be conformal with an adjacent exterior surface of the device housing, or may be depressed with respect to an adjacent surface of the device housing.

Figure 2A:
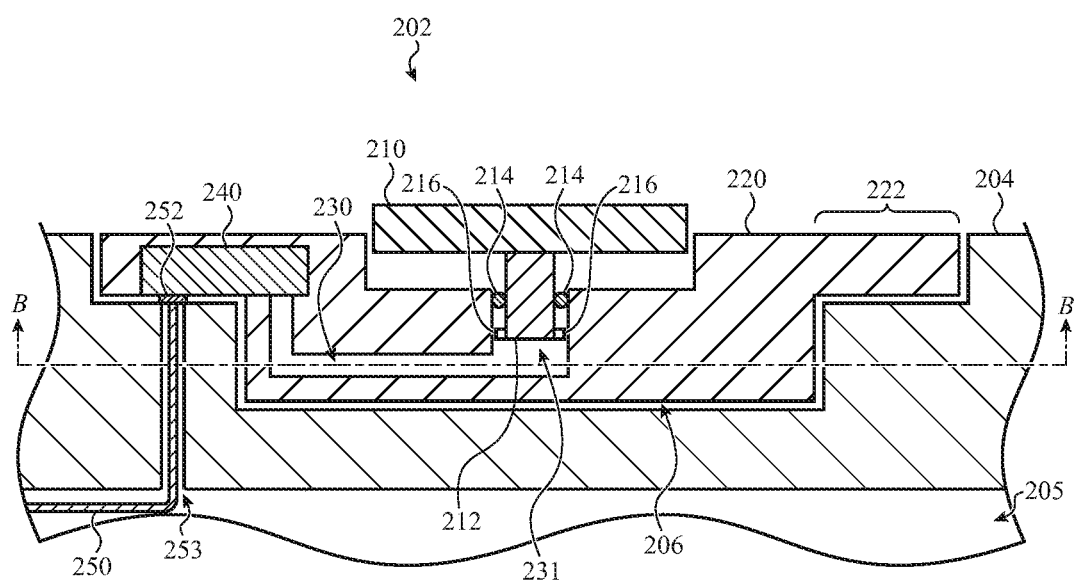
FIG. 2A is a cross-section of an example button assembly disposed in an opening of an electronic device, according to an embodiment.

FIG. 2A is a cross-section of an example button assembly disposed in an opening of an electronic device, according to an embodiment. The button assembly 202 is similar to the button assembly 102 of FIG. 1, and includes a pressure sensor 240 that is configured to detect changes in pressure in a compression chamber 230. As noted above, the pressure changes detected by the pressure sensor 240 may be interpreted as inputs by the electronic device. In the embodiment of FIG. 2A, the button assembly 202 includes a shaft 212 that extends at least partially into the compression chamber 230. The shaft 212 is coupled to an input member 210. The shaft 212 and the input member 210 are configured to translate up and down (with respect to FIG. 2A). As the input member 210 and the shaft 212 translate, the shaft 212 is configured to move up and down within the compression chamber 230, thereby changing the volume of the compression chamber. The compression chamber 230 is sealed such that, as the shaft 212 moves, the pressure in the compression chamber changes according to Boyle's law. Accordingly, when a user exerts a force (e.g., presses, pulls, and so on) on the input member 210 that causes the shaft 212 to move, the pressure sensor 240 detects a change in pressure that may be interpreted as an input by the electronic device.

Figure 2B:
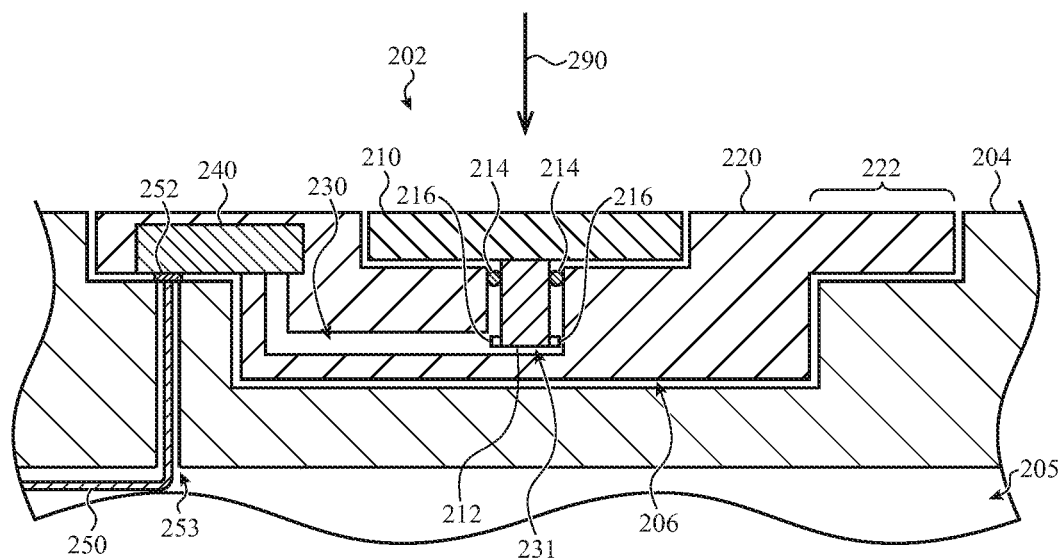
FIG. 2B illustrates the cross-section of FIG. 2A with the input member in a depressed position.

In the example of FIG. 2A, the input member 210 and the shaft 212 are in a neutral or default position, in which no force is being applied to move the input member 210. FIG. 2B illustrates the cross-section of FIG. 2A with the input member 210 in a depressed position, for example as a result of a downward force 290 being applied to the input member 210 (e.g., a press of the input member). The input member 210 is depressed into an opening 234 of the button housing 220, and the shaft 212 is depressed into a passage 231 of the compression chamber 230. As a result, the volume of the compression chamber 230 is reduced, and pressure in the compression chamber is increased compared to the neutral position. The pressure increase may be detected by the pressure sensor 240 and registered as an input (e.g., a press of the button) by the electronic device.

Figure 2C:
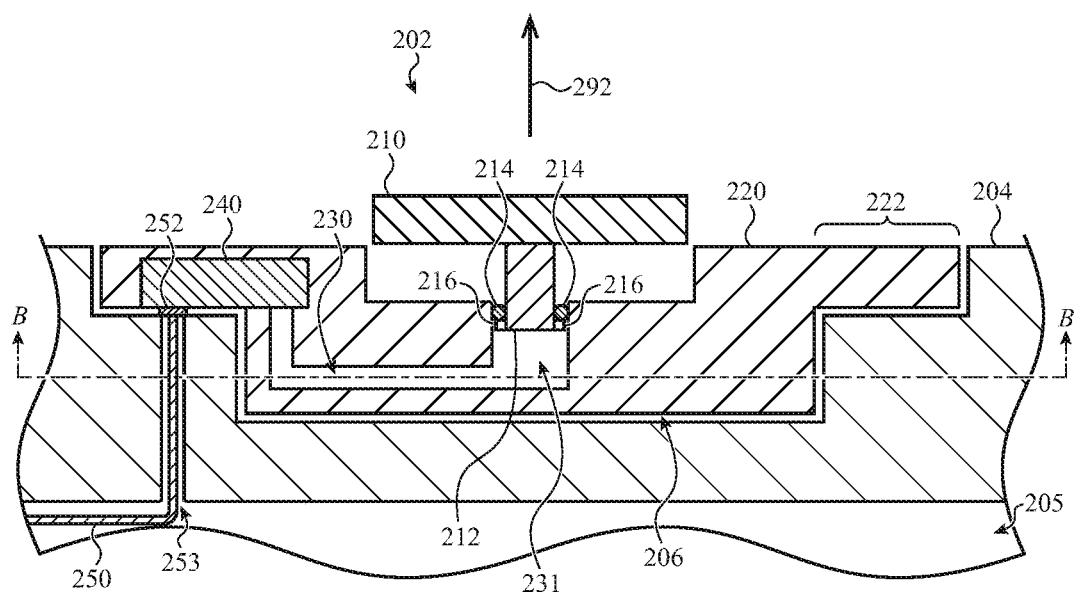
FIG. 2C illustrates the cross-section of FIGS. 2A-2B with the input member in an extended position.

FIG. 2C illustrates the cross-section of FIGS. 2A-2B with the input member 210 in an extended position, for example as a result of an upward force 292 being applied to the input member 210 (e.g., a pull of the input member). The shaft 212 is moved upward within the passage 231, thereby increasing the volume of the compression chamber 230. As a result, the pressure in the compression chamber 230 is decreased compared to the neutral position. In various embodiments, the input member 210 and shaft 212 may return to a default position (e.g., the default position of FIG. 2A) when an applied force is removed.

As noted above, the shaft 212 is configured to move in and out of the compression chamber 230, thereby changing its volume. In one embodiment, the shaft 212 is coupled to the input member 210. In another embodiment, the shaft 212 and the input member 210 are integrated as a single part. The shaft 212 may be a bar having a generally cylindrical shape and made of any suitable material including metals (e.g., aluminum, titanium, and the like), polymers, and so on.

As illustrated in FIG. 2C, the shaft 212 may include a collar 216 configured to retain the shaft and the input member 210 in the button housing 220 when the shaft is in an extended position. In the illustration of FIG. 2C, the collar 216 is positioned at a bottom end of the shaft 212 such that the collar cannot move past the seal 214, thus retaining the shaft and input member 210 in the button housing 220. In various embodiments, different retention mechanisms may be used to retain the shaft and/or the input member in the button housing 220.

In one embodiment, the seal 214 is disposed between the shaft 212 and a surface of the button housing 220. The seal 214 is configured to provide an airtight seal of the compression chamber 230, for example to contain the contents of the compression chamber 230 and/or exclude contaminants (e.g., dirt, liquids, and so on) from the compression chamber. In one embodiment, the seal 214 is an O-ring seal disposed around the shaft 212, and the seal is compressed between the shaft 212 and a surface of the button housing 220 such that the compression chamber 230 is sealed. The seal 214 is shown as a single O-ring seal for purposes of illustration, but in various embodiments, the seal 214 may be any type of mechanical seal, adhesive, seal, or the like, including but not limited to, gaskets, O-rings, face seals, plugs, washers, and the like. Additionally, multiple seals 214 may be used to seal the compression chamber 230.

In one embodiment, the seal 214 is attached to the shaft 212 and is configured to move relative to the button housing 220 as the shaft 212 moves. In another embodiment, the seal 214 is attached to the button housing 220 such that the shaft 212 moves relative to the button housing 220 and the seal 214.

The pressure sensor 240 is operably coupled to the compression chamber 230 and configured to output a signal in response to the pressure changing in the compression chamber 230. As noted above, the signal indicating a pressure change may be interpreted by the electronic device as an input. The pressure sensor may be configured to measure pressure changes, absolute pressure and/or differential pressure. In various embodiments, the pressure sensor 240 may measure pressure and/or pressure changes using a variety of methods and techniques, including piezoresistive strain gauge, capacitive, electromagnetic, piezoelectric, optical, potentiometric, and so on.

In the embodiment of FIG. 2A, the pressure sensor 240 is at least partially disposed within the button housing 220. In various embodiments, the pressure sensor 240 may be disposed at any suitable location within the button assembly 202, the electronic device, or some combination thereof. As shown in FIG. 2A, the device housing 204 defines an enclosed volume 205, and may include a passage 253 between the enclosed volume 205 and the opening 206 such that the button assembly 102 and additional components of the electronic device may be physically coupled, for example by an electrical connector 250. For example, the pressure sensor 240 may be electrically connected to a processor of the electronic device via the electrical connector 250. The electrical connector 250 is illustrated as a flex cable, but may be any suitable electrical connector for facilitating communication between the button assembly 202 and components of the electronic device, such as wire, cable, and the like.

The electrical connector 250 may be coupled to the pressure sensor 240 directly or indirectly. For example, as shown in FIG. 2A, the electrical connector 250 is coupled to the pressure sensor 240 via a contact 252 disposed near an opening of the passage 253. In various embodiments, the contact 252 is configured to interface with the pressure sensor 240 and the electrical connector 250. The contact 252 may be integrated with the pressure sensor 240, the button housing 220, the electrical connector 250, and/or the device housing 204, or it may be a separate component.

The button housing 220 houses various button assembly components. In various embodiments, the button housing 220 is configured to be attached to or disposed in an opening 206 of the housing 204 of the electronic device. The button assembly 202 may be attached to the device housing 204 using a variety of methods, including fasteners (e.g., screws, bolts, clips, and so on), adhesives, welding, pressure fitting, and the like.

As shown in FIG. 2A, the button housing 220 may include one or more outer portions 222 that act as a wing, flange, or collar for disposing the button housing 220 in the device housing 204. In one embodiment, the outer portions 222 are configured to rest on a shelf of the device housing 204. In various embodiments, the button housing 220 is attached to the device housing 204 at the outer portions 222.

Figure 2D:
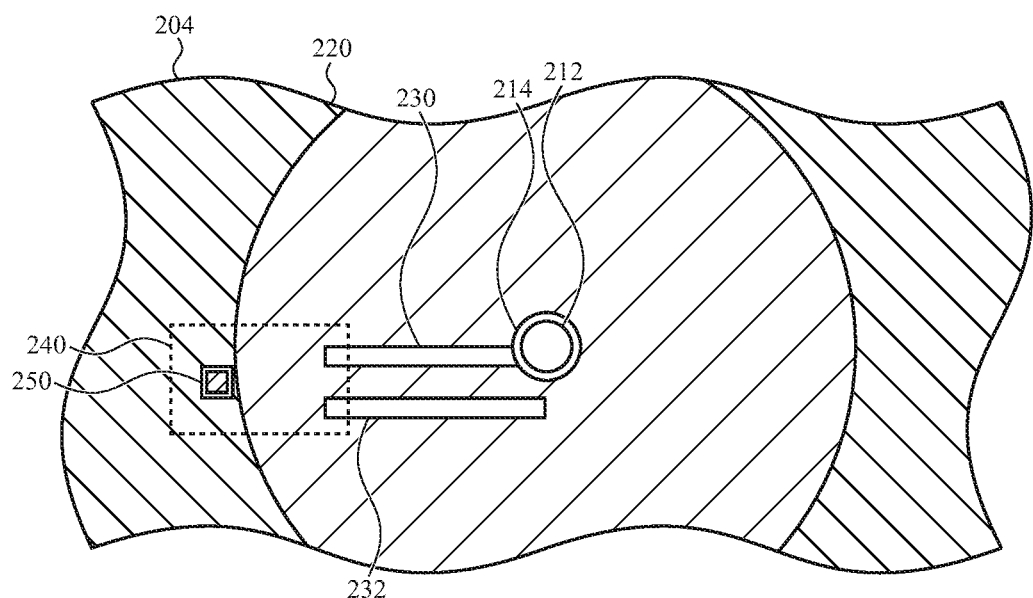
FIG. 2D is a cross section of an example button assembly taken through section line B-B of FIG. 2A.

As noted above, the button assembly may include one or more reference chambers configured to provide a reference pressure for comparison with the pressure in the compression chamber. FIG. 2D is a cross section of the button assembly 202, including a reference chamber 232, taken through section line B-B of FIG. 2A. In the example of FIG. 2D, the reference chamber 232 is coupled to the pressure sensor 240. The pressure sensor 240 may be a differential or sealed pressure sensor that is configured to compare the pressure in the compression chamber to the pressure in the reference chamber to detect a difference between the compression chamber and the reference chamber. Additionally or alternatively, the pressure sensor 240 may be an absolute pressure sensor configured to determine an absolute pressure in the compression chamber 230 and the reference chamber 232. In other embodiments, separate pressure sensors may be used to determine the pressure and/or change in pressure within the compression chamber 230 and the reference chamber 232. In the embodiment of FIG. 2D, one compression chamber 230 and one reference chamber 232 are illustrated, however in practice any number of compression chambers and reference chambers may be used.

Similar to the button assembly 102, the compression chamber 230 and/or the reference chamber 232 may include one or more valves configured to fluidly couple the compression chamber 230 and/or the reference chamber 232 with one another, with other chambers, enclosed volumes and/or the atmosphere. In one embodiment, a valve is configured to fluidly couple the compression chamber 230 with the reference chamber 232 such that when the valve is opened, the pressures equalize or move toward equilibrium.

Figure 3A:
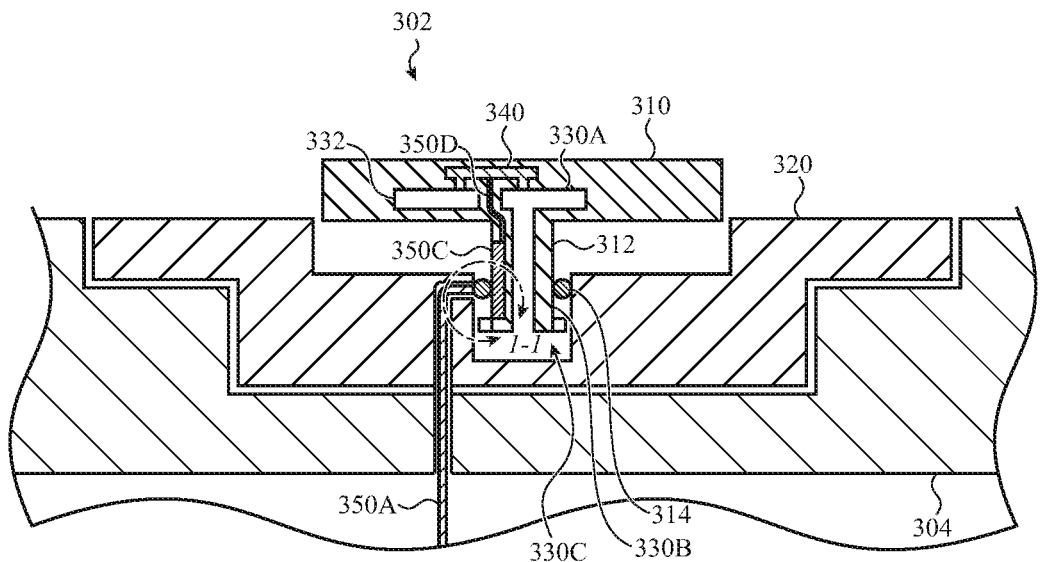
FIG. 3A is a cross-section of an example button assembly disposed in an opening of an electronic device, according to an embodiment.

FIG. 3A is a cross-section of an example button assembly disposed in an opening of an electronic device, according to an embodiment. The button assembly 302 is similar to the button assemblies 102, 202 discussed above. In the embodiment of FIG. 3A, the reference chamber 332, the pressure sensor 340, and a portion 330A of the compression chamber is located in the input member 310. The button assembly 302 includes a shaft 312 that is integrated with the input member 310. A portion 330B of the compression chamber is located in the shaft 312 and couples the portion 330A with a portion 330C in the button housing 320. As the input member 310 and shaft 312 move up and down relative to the button housing 320, the volume of the sealed compression chamber 330 changes and the pressure changes as a result. The pressure sensor 340 is fluidly coupled to the compression chamber 330 and the reference chamber 332 and is configured to detect pressure differentials, pressure changes and/or pressure values of the compression chamber 330 and the reference chamber 332.

Figure 3B:
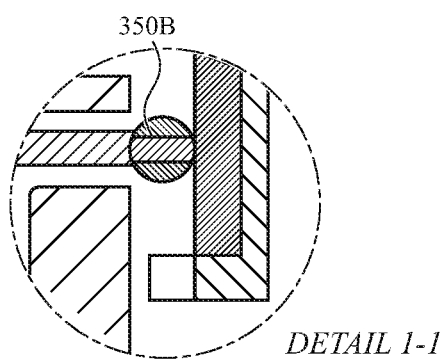
FIG. 3B illustrates a removed view of a portion of the example button assembly identified by the enclosed circle 1-1 shown in FIG. 3A.

The button assembly 302 includes an electrical connector 350 configured to electrically couple the button assembly 302 to other components of the electronic device, such as a processor. In one embodiment, the electrical connector 350 includes multiple components, including a flex cable 350A extending through the button housing 320 and/or the device housing 304. The electrical connector 350 may further include a contact 350B coupled to the flex cable 350A. At least a portion of the contact 350B is positioned between a surface of the button housing 320 and a surface of the shaft 312. FIG. 3B illustrates a removed view of a portion of the example button assembly identified by the enclosed circle 1-1 shown in FIG. 3A. The contact 350B is configured to maintain an electrical connection with a contact 350C on the shaft 312 as the shaft moves up and down. In one embodiment, the contact 350B is disposed within the seal 314. Returning to FIG. 3A, the pressure sensor 340 is electrically coupled to the contact 350C, for example by a connector 350D disposed within the input member 310.

The button assemblies shown in FIGS. 2A-3B include one compression chamber, and one shaft. However, in various embodiments, a button assembly may include multiple compression chambers and/or shafts. The button assembly may further include multiple pressure sensors configured to measure pressure values or pressure changes within each compression chamber. The outputs of the multiple pressure sensors may be used to determine additional information about an input, including a position of the input on an input surface, a direction of an input, and so on.

Figure 4:
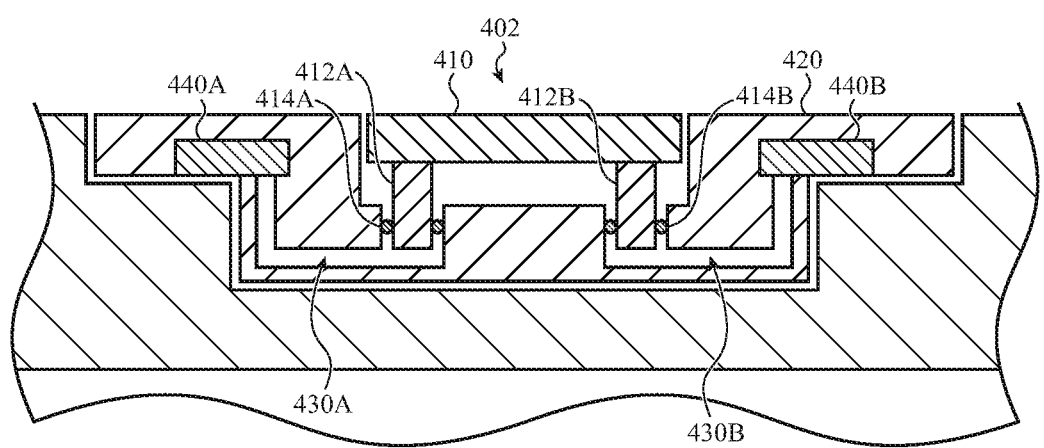
FIG. 4 is a cross-section of an example button assembly disposed in an opening of an electronic device, according to an embodiment.

FIG. 4 is a cross-section of an example button assembly disposed in an opening of an electronic device, according to an embodiment. The button assembly 402 is similar to the button assemblies discussed above. The button assembly 402 includes multiple shafts 412, compression chambers 430, and pressure sensors 440. In the embodiment of FIG. 4, two shafts 412A and 412B are shown. Each shaft 412 is configured to move relative to a respective compression chamber 430, thereby changing the volume of the compression chamber. Each compression chamber 430A and 430B is coupled to a pressure sensor 440. The pressure sensors 440A and 440B are configured to measure pressure values or pressure changes within each compression chamber. In the embodiment of FIG. 4, the two outputs of the two pressure sensors 440 can be used to determine an angle or tilt of the input member 410 in response to an input and/or a position of the input on the input member. The ability to determine a tilt or angle of the input member 410 makes the button assembly 402 suitable for a toggle switch, rocker switch, or the like. The button assembly 402 further includes seals 414A and 414B disposed between the shafts 412A and 412B and respective surfaces of the button housing 420. The seals 414 are similar to the seals 214, 314 discussed above.

Figure 5:
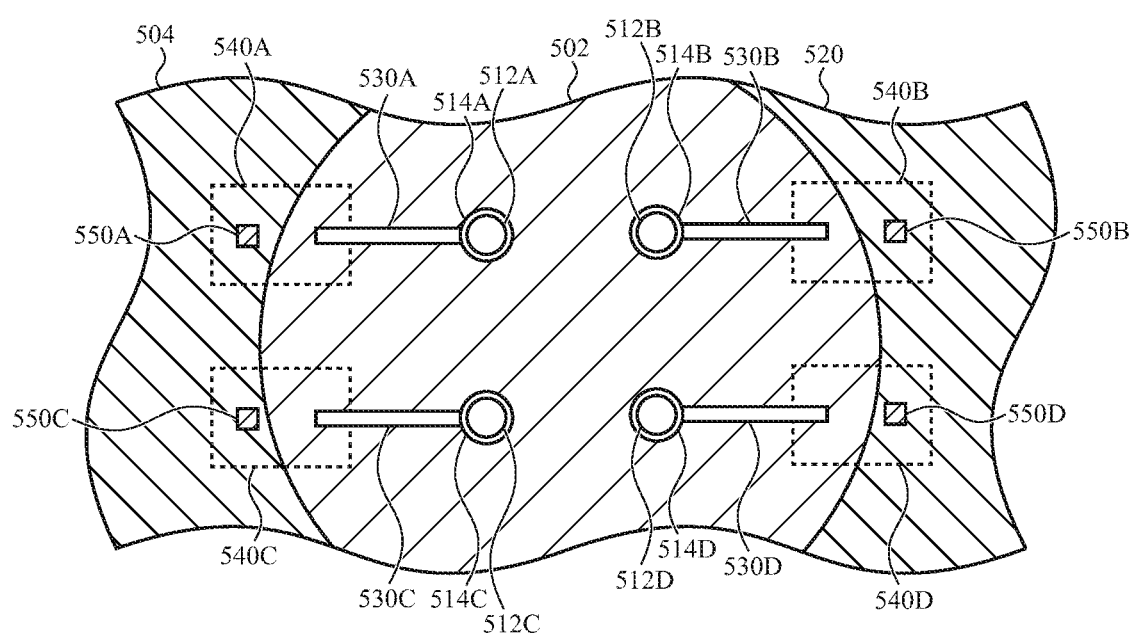
FIG. 5 is a cross-section of an example button assembly disposed in an opening of an electronic device, according to an embodiment.

FIG. 5 is a cross-section of an example button assembly disposed in an opening of an electronic device, according to an embodiment. FIG. 5 shows a top-down cross-section similar to the cross-section of FIG. 2D of a button assembly 502 with four shafts 512A-D, four compression chambers 530A-D, and four pressure sensors 540A-D. A button housing 520 of the button assembly 502 may be disposed in an opening of a device housing 504 as described above. Similar to the embodiments described above, each shaft 512 is configured to move relative to a respective compression chamber 530, thereby changing the volume of the compression chamber. Each pressure sensor 540 is coupled to a respective compression chamber 530 and configured to measure pressure values or pressure changes within the coupled compression chamber. The outputs of the pressure sensors 540 may be used to determine an angle or tilt of an input surface in two dimensions (e.g., up-down and right-left with respect to FIG. 5). The ability to determine a tilt or angle of the input surface in two dimensions makes the button assembly 502 suitable for a directional button, a joystick, or the like.

The button assembly 502 includes various components that are similar to those discussed with respect to other embodiments. For example, the button assembly 502 includes electrical connectors 550A-D for coupling the pressure sensors 540 to other components of the electronic device. The button assembly 502 further includes seals 514A-D disposed between the shafts 512A-D and respective surfaces of the button housing 520. The seals 514 are similar to the seals 214, 314, 414 discussed above.

Figure 6A:
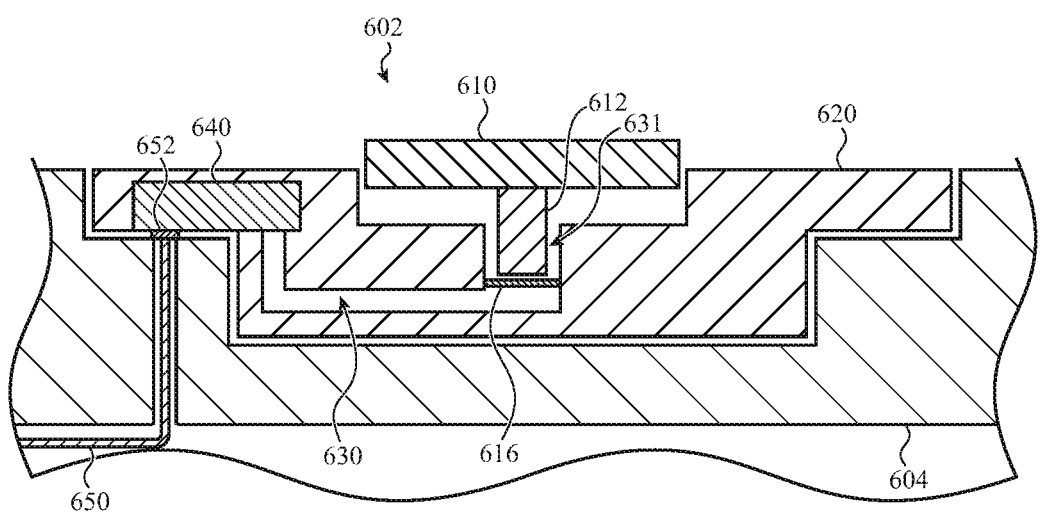
FIG. 6A is a cross-section of an example button assembly disposed in an opening of an electronic device, according to an embodiment.

FIG. 6A is a cross-section of an example button assembly disposed in an opening of an electronic device, according to an embodiment. The button assembly 602 is similar to the button assemblies discussed above. A button housing 620 of the button assembly 602 may be disposed in an opening of a device housing 604 as described above. The button assembly 602 includes a flexible membrane 616 that defines a wall of the compression chamber 630. In the embodiment of FIG. 6, the flexible membrane 616 is disposed in a passage 631 of the button housing 620. The button assembly includes an input member 610 and a shaft 612 that are configured to translate similar to the input members and shafts discussed above (e.g., input member 210 and shaft 212). The flexible membrane 616 is configured to deform, deflect, or bend in response to the shaft 212 translating and exerting a force on the flexible membrane. The flexible membrane 616 further forms a seal that contains the contents of the compression chamber 630.

Figure 6B:
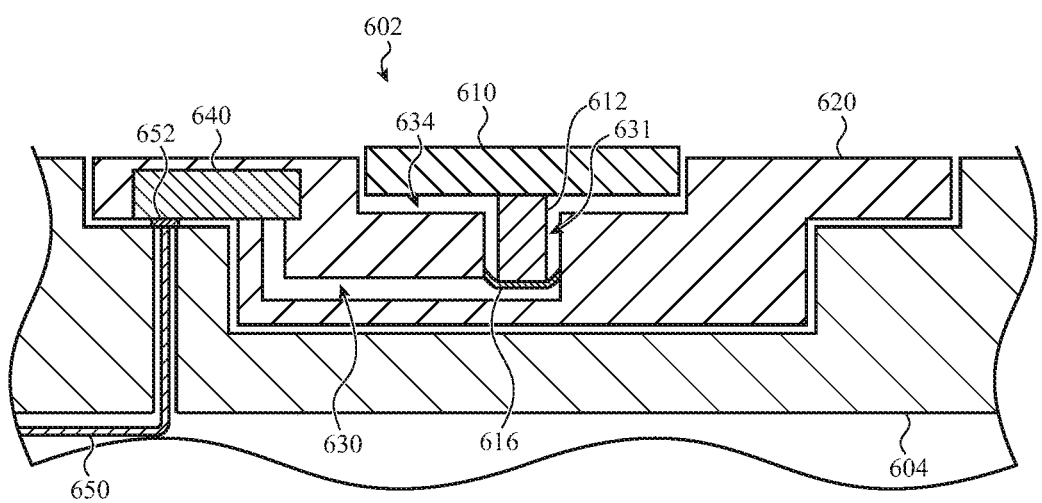
FIG. 6B illustrates the input member and the shaft translated downward.

FIG. 6B illustrates the input member 610 and the shaft 612 translated downward (with respect to FIG. 6B), for example as a result of a force applied to the input member 610. The movement of the shaft 612 results in the flexible membrane 616 deforming and thereby reducing the volume of the compression chamber 630 and increasing the pressure in the chamber. Similar to the pressure sensors described above, the pressure sensor 640 is configured detecting pressure values and/or pressure changes and output a signal that may be interpreted as an input. In one embodiment, the flexible membrane 616 causes the shaft 612 and the input member 610 to return to a default position (e.g., the position of FIG. 6A) when an applied force is removed.

The flexible membrane 616 may be attached to the shaft 612, for example by an adhesive, such that the flexible membrane deforms upward when the shaft 612 moves upward from the default position of FIG. 6A, for example as a result of an upward force being applied to the input member 610. The flexible membrane 616 deforming upward increases the volume of the compression chamber 630, thereby reducing the pressure in the compression chamber. This pressure change may be detected by the pressure sensor 640 interpreted as an input.

The button assembly 602 includes various components that are similar to those discussed with respect to other embodiments. For example, the button assembly 602 includes electrical connector 650 and contact 652 for coupling the pressure sensor 640 to other components of the electronic device.

Figure 7:
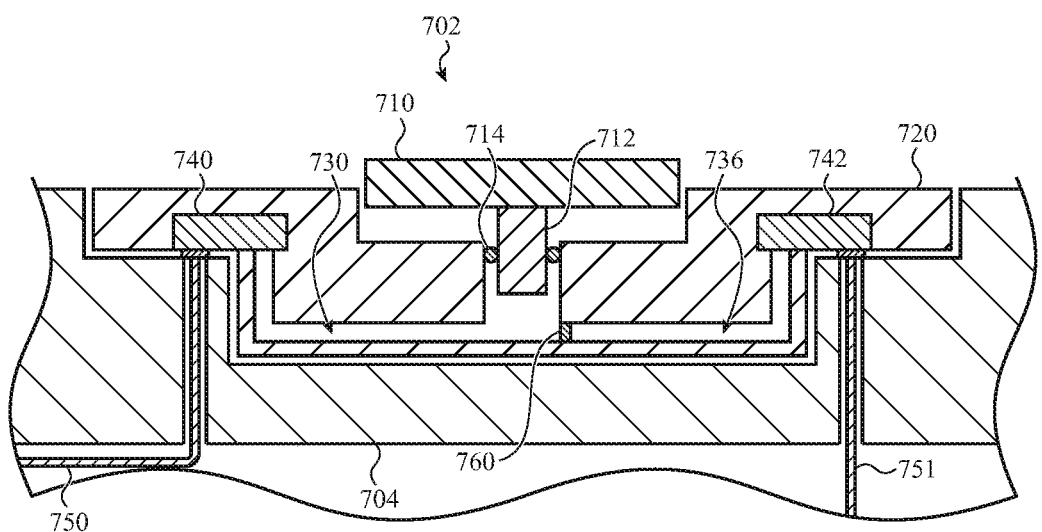
FIG. 7 is a cross-section of an example button assembly disposed in an opening of an electronic device, according to an embodiment.

As discussed above, some button assemblies include functionality for providing tactile feedback or tactile outputs to users. FIG. 7 is a cross-section of an example button assembly disposed in an opening of an electronic device, according to an embodiment. The button assembly 702 is similar to the button assemblies discussed above, and may be disposed in a device housing 704 as shown in FIG. 7. The button assembly 702 includes a pressure change actuator 742 configured to change the pressure in the compression chamber 730, for example to provide tactile output through the input member 710. In the example of FIG. 7, the button housing 720 includes a pressure chamber 736 coupled to the pressure change actuator 742. The pressure change actuator 742 is configured to change the pressure in the pressure chamber 736, creating a pressure differential between the compression chamber 730 and the pressure chamber 736. The pressure chamber 736 is coupled to the compression chamber 730 via a valve 760. The valve 760 is configured to fluidly couple the compression chamber 730 and the pressure chamber 736 when opened, thereby equalizing or moving toward equilibrium the pressures in the two chambers.

In one embodiment, the pressure change actuator 742 increases the pressure in the pressure chamber 736 such that when the valve 760 is opened, the pressure changes (increases or decreases) in the compression chamber 730, resulting in a force being applied the shaft 712 and the input member 710 (upward or downward with respect to FIG. 7). This force may be felt by a user as a tactile output. In one embodiment, the valve may be opened during movement of the shaft 712 and the input member 710 such that the user perceives a change in resistance of movement of the input member 710. In various embodiments, the resistance of the movement of the input member 710 may mimic the behavior of a mechanical switch.

In another embodiment, the pressure change actuator 742 is configured to change the pressure in the compression chamber 730, for example to set the pressure in the compression chamber to a desired level. This may be used to account for changes in temperature, atmospheric pressure, and the like that result in changes in the pressure of the compression chamber 730.

The pressure change actuator 742 may be operably coupled to additional components of the electronic device and/or the pressure sensor 740, for example via one or more electrical connectors 750, 751. The electrical connectors 750, 751 are illustrated as flex cables, but may be any suitable electrical connectors for facilitating communication between the button assembly 702 and components of the electronic device, such as wire, cable, and the like. In one embodiment, the pressure change actuator 742 is controlled by a processor of the electronic device.

The button assembly 702 includes various components that are similar to those discussed with respect to other embodiments. For example, the button assembly 702 includes a seal disposed between the shaft 712 and a surface of the button housing 720. The seals 714 are similar to the seals 214, 314, 414, 514 discussed above.

Figure 8:
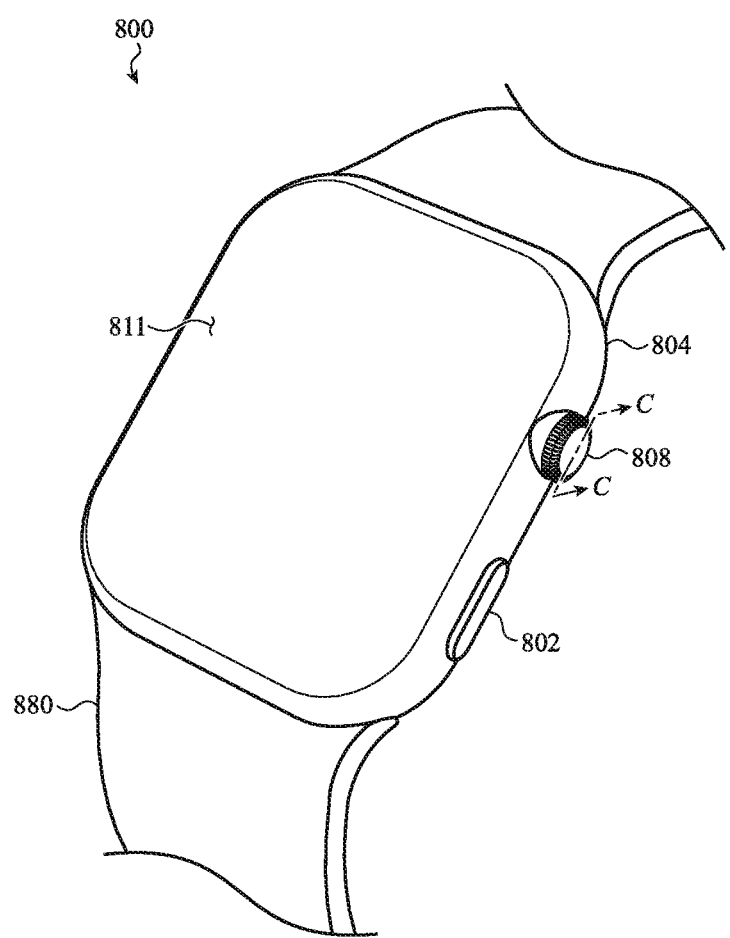
FIG. 8 illustrates an example wearable electronic device that may incorporate one or more button assemblies as described herein.

As described above, a button assembly may be disposed in any electronic device. In one embodiment, the button assembly is disposed in a wearable electronic device such as a watch. FIG. 8 illustrates an example wearable electronic device 800 that may incorporate one or more button assemblies as described herein.

In the illustrated embodiment, the electronic device 800 is implemented as a wearable computing device (e.g., an electronic watch). Other embodiments can implement the electronic device differently. For example, the electronic device can be a smart telephone, a gaming device, a digital music player, a device that provides time, a health assistant, and other types of electronic devices that include, or can be connected to a sensor(s).

In the embodiment of FIG. 8, the wearable electronic device 800 includes a device housing 804 at least partially surrounding a display 811, a watch crown 808, and one or more buttons 802. The wearable electronic device 800 can also include one or more internal components (not shown) typical of a computing or electronic device, such as, for example, one or more processors, memory components, network interfaces, and so on.

Returning to FIG. 8, the watch crown 808, the button 802, or both may be implemented as button assemblies as described herein. The watch crown 808 and the button 802 are disposed in a sidewall of the device housing 804, and are permanently or releasably attached to the device housing.

The device housing 804 provides a device structure, defines an internal volume of the wearable electronic device, and houses device components. In various embodiments, the device housing 804 may be constructed from any suitable material, including metals (e.g., aluminum, titanium, and the like), polymers, ceramics (e.g., glass, sapphire), and the like. In one embodiment, the device housing 804 is constructed from multiple materials. The device housing 804 can form an outer surface or partial outer surface and protective case for the internal components of the wearable electronic device 800, and may at least partially surround the display 811. The device housing 804 can be formed of one or more components operably connected together, such as a front piece and a back piece. Alternatively, the device housing 804 can be formed of a single piece operably connected to the display 811.

The display 811 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 811 provides a graphical output, for example associated with an operating system, user interface, and/or applications of the electronic device 800. In one embodiment, the display 811 includes one or more sensors and is configured as a touch-sensitive (e.g., single-touch, multi-touch) and/or force-sensitive display to receive inputs from a user. In various embodiments, a graphical output of the display 811 is responsive to inputs provided to the button 802 and/or the watch crown 808.

The watch crown 808 receives inputs, for example from a user. In one embodiment, the watch crown 808 is configured to rotate about an axis and translate along the axis in response to manipulation. The watch crown 808 may further include a switch such as a dome switch to provide a tactile response to translation of the watch crown. In some embodiments, a button assembly may be integrated with the watch crown 808 such that the watch crown has some or all of the characteristics of the button assemblies described herein.

The wearable electronic device 800 can be permanently or removably attached to a band 880. The band may be used to attach the wearable electronic device 800 to the body of a user. The band can be made of any suitable material, including, but not limited to, leather, metal, rubber or silicon, fabric, and ceramic. In the illustrated embodiment, the band is a wristband that wraps around the user's wrist. The wristband can include an attachment mechanism, such as a bracelet clasp, Velcro, and magnetic connectors. In other embodiments, the band can be elastic or stretchable such that it fits over the hand of the user and does not include an attachment mechanism.

Figure 9A:
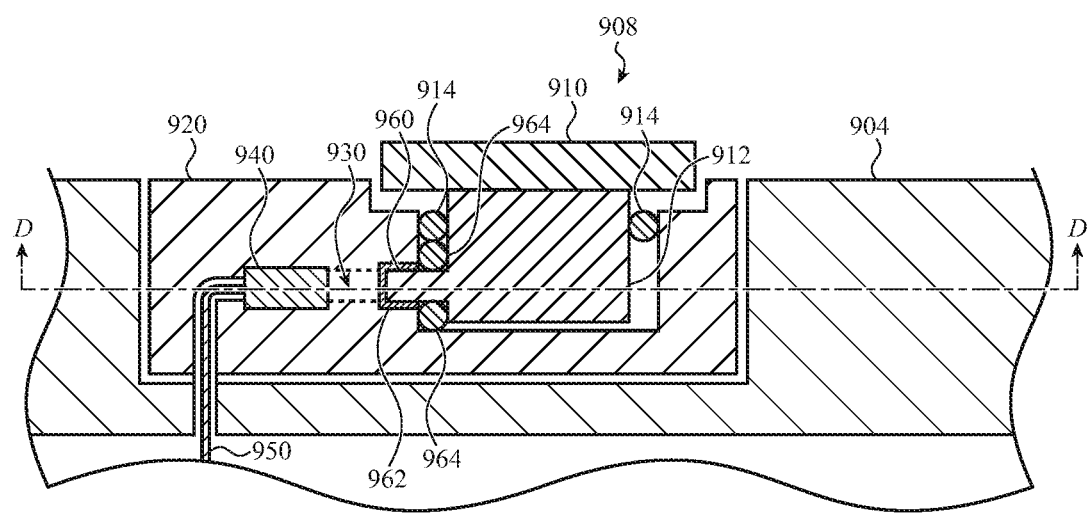
FIG. 9A is a cross-section of a watch crown disposed in an opening of the wearable electronic device taken through section line C-C of FIG. 8.

FIG. 9A is a cross-section of a watch crown 908 disposed in an opening of the wearable electronic device 800 taken through section line C-C of FIG. 8. The watch crown 908 includes a button housing 920 and an input member 910 that is configured to receive rotational inputs. The input member 910 is coupled to a shaft 912 that extends into an opening of the button housing 920. The shaft 912 includes an arm 960 that is configured to change the volume of a compression chamber 930 responsive to torque (e.g., a rotational force) applied to the input member 910. In one embodiment, the watch crown 908 is disposed in a device housing 904, which is similar to the device housing 804 discussed above with respect to FIG. 8.

Figure 9B:
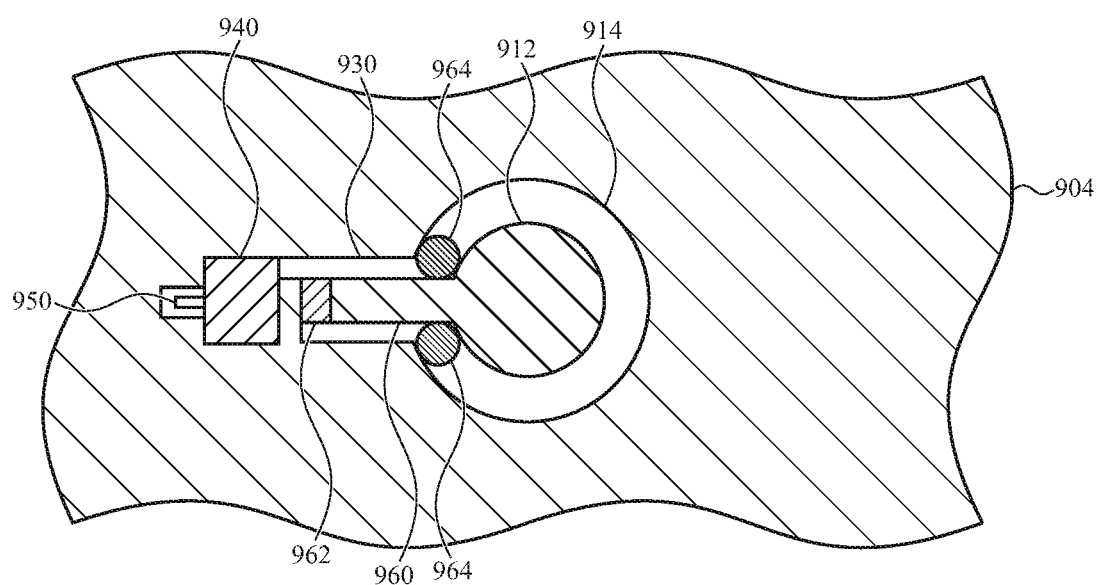
FIG. 9B is a cross-section of the watch crown taken through section line D-D of FIG. 9A.

FIG. 9B is a cross-section of the watch crown 908 taken through section line D-D of FIG. 9A. The arm 960 forms at least a part of a wall of the compression chamber 930 such that when the shaft 912 rotates causing the arm 960 to move, the volume of the compression chamber 930 increases or decreases. As described above, a pressure sensor 940 is configured to detect the change in pressure, which may then be interpreted as an input.

Figure 9C:
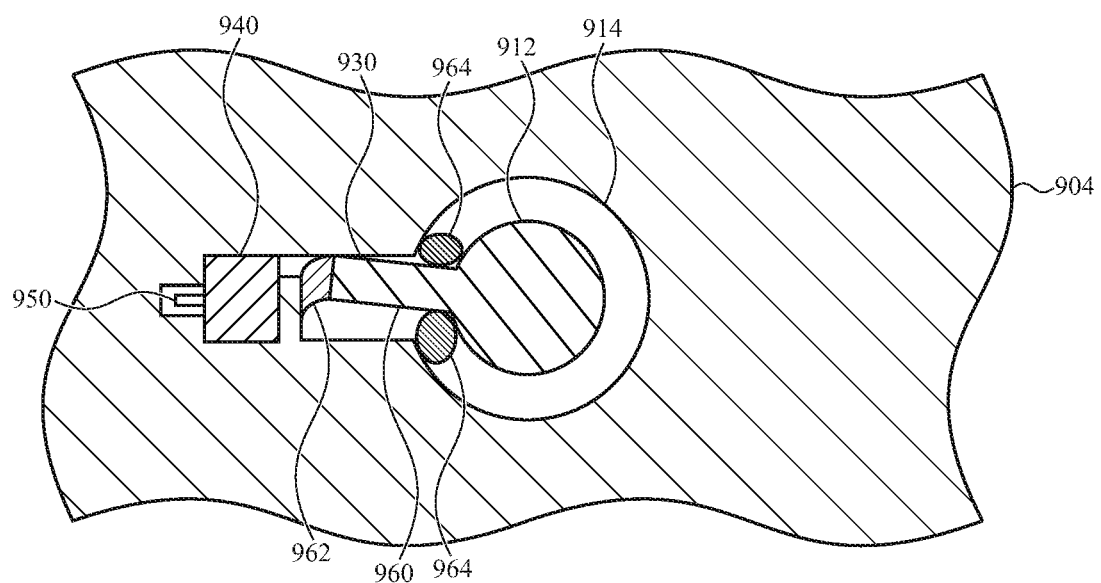
FIG. 9C illustrates the cross-section of FIG. 9B with the arm displaced in response to a torque applied in the clockwise direction.

FIG. 9C illustrates the cross-section of FIG. 9B with the arm 960 displaced in response to a torque applied in the clockwise direction. As shown in FIG. 9B, the volume of the compression chamber 930 is reduced as a result of the movement of the arm 960, and the pressure in the compression chamber is increased compared to the neutral position of FIG. 9B. The pressure increase may be detected by the pressure sensor 940 and registered as an input by the wearable electronic device 900.

Figure 9D:
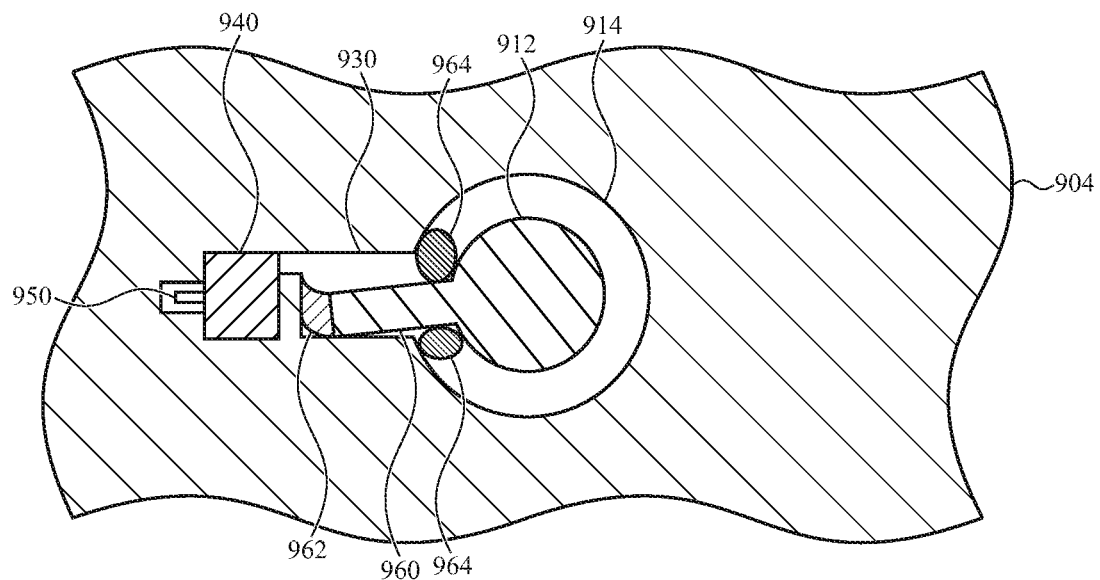
FIG. 9D illustrates the cross-section of FIG. 9B with the arm displaced in response to a torque applied in the counter-clockwise direction.

FIG. 9D illustrates the cross-section of FIG. 9B with the arm 960 displaced in response to a torque applied in the counter-clockwise direction. As shown in FIG. 9C, the volume of the compression chamber 930 is increased as a result of the movement of the arm 960, and the pressure in the compression chamber is decreased compared to the neutral position of FIG. 9B. The pressure decrease may be detected by the pressure sensor 940 and registered as an input by the wearable electronic device 900. In various embodiments, the arm 960 may return to a default position (e.g., the default position of FIG. 9B) when an applied force is removed.

A seal 964 seals the compression chamber. The seal 964 is disposed around the arm 960 and is formed of a compliant material such that the arm can move. As shown in FIGS. 9A and 9B, a compliant member 962 is disposed between the arm and one or more surfaces of the button housing 920 and is configured to allow the arm 960 to move while maintaining a seal of the compression chamber 930. In one embodiment, the arm 960 is formed of a compliant material and is configured to deform, flex, or bend, thereby changing the volume of the compression chamber 930.

The watch crown 908 may include a seal 914 for excluding contaminants from entering the button housing 920 and/or retaining the shaft 912 and input member in the button housing. The watch crown 908 may be operably coupled to one or more components of the wearable electronic device 900, such as a processor, by an electrical connector 950.

In one embodiment, the watch crown 908 includes a second compression chamber and a second pressure sensor that are configured to detect translation (e.g., movement up and down with respect to FIG. 9A) of the input member 910 and the shaft 912.

The input member 910 may be configured to rotate relative to the shaft 912, for example to mimic the operation of a conventional watch crown. The rotational motion may have sufficient resistance such that a torque is applied to the shaft 912 while the input member 910 is rotating so that the arm 960 moves or deflects to change the volume of the compression chamber 930.

Figure 10:
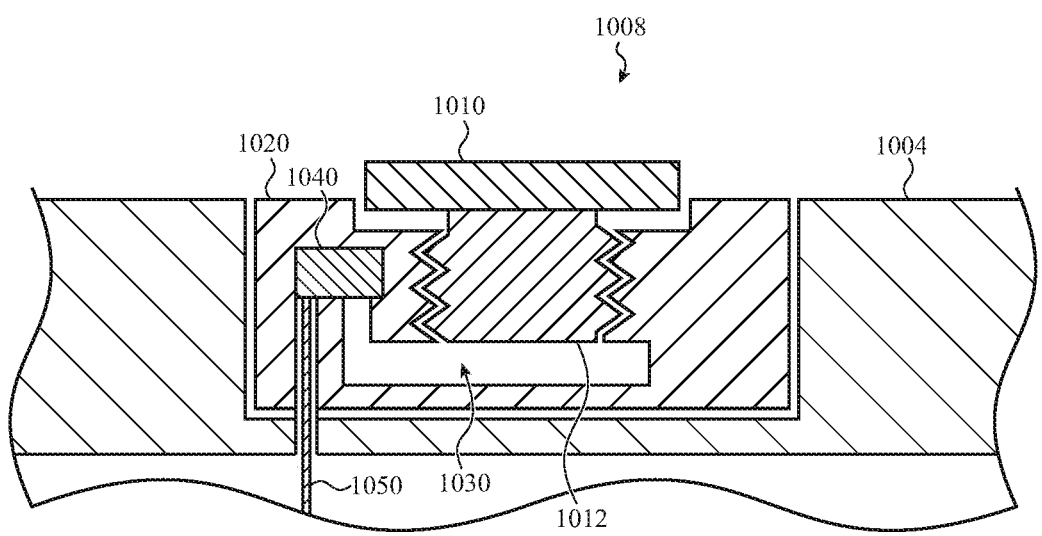
FIG. 10 is a cross-section of a watch crown disposed in an opening of a wearable electronic device according to an embodiment.

FIG. 10 is a cross-section of a watch crown 1008 disposed in an opening of a wearable electronic device according to an embodiment. The watch crown 1008 includes a threaded shaft 1012 coupled to an input member 1010. A button housing 1020 includes a compression chamber 1030. The threads of the shaft 1012 are configured to convert rotational motion of the input member 1010 and shaft 1012 to linear motion of the input member and shaft (up and down with respect to FIG. 10). As the shaft 1012 moves up and down, it changes the volume of the compression chamber 1030. As discussed above, this results in a change in the pressure in the compression chamber 1030. A pressure sensor 1040 is configured to detect the pressure change, which may be registered as an input by the wearable electronic device. In one embodiment, the watch crown 1008 is disposed in a device housing 1004, which is similar to the device housing 804 discussed above with respect to FIG. 8.

The watch crown 1008 includes various components that are similar to those discussed with respect to other embodiments. For example, the watch crown 1008 includes an electrical connector 1050 for coupling the pressure sensor 1040 to other components of the electronic device.

Figure 11:
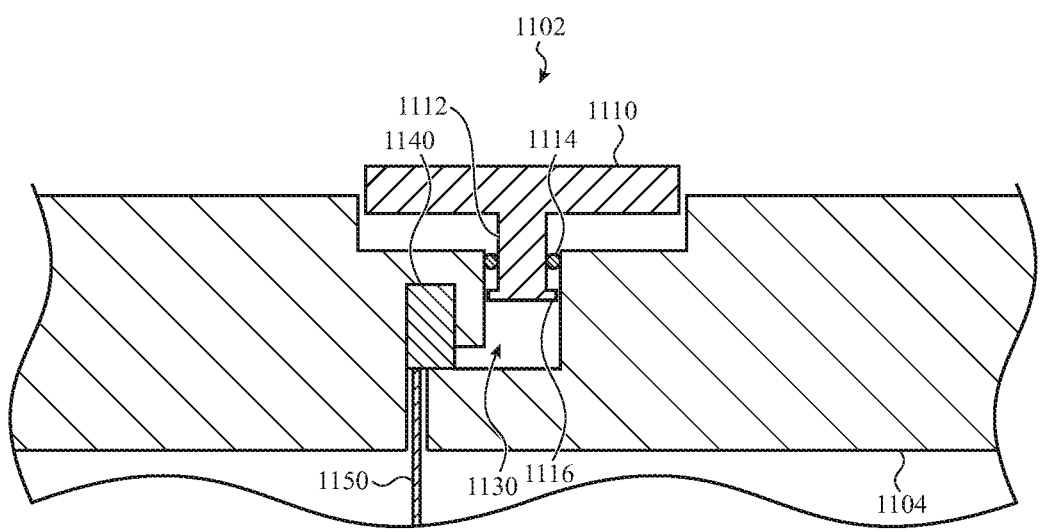
FIG. 11 is a cross-section of an example button assembly, according to an embodiment.

Various embodiments described herein include a button housing and/or a compression chamber defined by or disposed within a button housing. In other embodiments, the compression chamber may be positioned at a different location of an electronic device. FIG. 11 is a cross-section of an example button assembly 1102, according to an embodiment. In the example of FIG. 11, the button assembly 1102 does not include a button housing, and the compression chamber 1130 is defined by an opening in a device housing 1104 that is sealed by a seal 1114 and a shaft 1112. The shaft 1112 is coupled to or integrated with an input member 1110 and is configured to move responsive to forces applied at the input member. The button assembly 1102 further includes a pressure sensor coupled to the compression chamber 1130 and disposed in the device housing 1104. The pressure sensor is coupled to other components of the electronic device via an electrical connector 1150. Similar to the button assemblies described above, movement (e.g., up and down with respect to FIG. 11) of the shaft 1112 causes the volume of the compression chamber 1130 to change. As discussed above, this results in a change in the pressure in the compression chamber 1130. A pressure sensor 1140 is configured to detect the pressure change, which may be registered as an input by the electronic device.

The button assembly 1102 includes various components that are similar to those discussed with respect to other embodiments. For example, the button assembly 1102 includes a collar 1116 configured to retain the shaft and the input member 1110 in the device housing 1104 when the shaft is in an extended position. The collar 1116 is similar to the collars (e.g., collar 216) discussed above.

Figure 12:
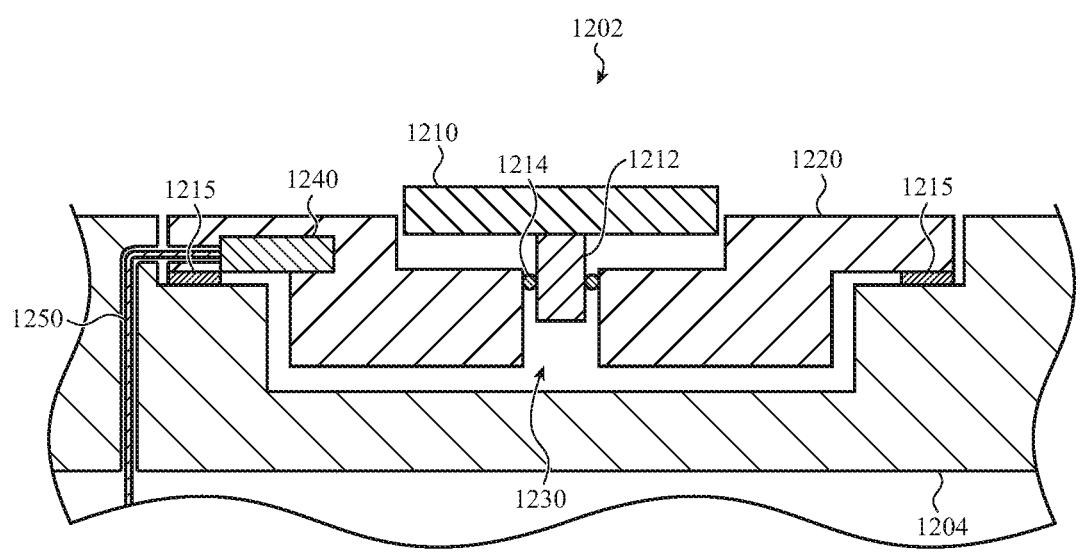
FIG. 12 is a cross-section of an example button assembly, according to an embodiment.

FIG. 12 is a cross-section of an example button assembly 1202, according to an embodiment. The button assembly 1202 includes a button housing 1220 disposed in an opening of a device housing 1204. In one embodiment, the button housing 1220 and the device housing 1204 cooperatively define at least a part of the compression chamber 1230. For example, in the example of FIG. 12, the compression chamber 1230 is formed between the button housing 1220 and the device housing 1204. The button assembly 1202 includes a seal 1215 (e.g., a gasket seal) disposed between the button housing 1220 and the device housing 1204 to seal the compression chamber 1230.

The button assembly 1202 includes various components that are similar to those discussed with respect to other embodiments. For example, the button assembly 1202 includes a pressure sensor 1240 that is similar to the pressure sensors (e.g., pressure sensor 240) described herein. The button assembly 1202 further includes a shaft 1212 that is similar to the shafts (e.g., shaft 212) discussed herein. The button assembly 1202 additionally includes an input member 1210 that is similar to the input members (e.g., input member 210) described herein. The button assembly 1202 still further includes an electrical connector 1250 that is similar to the electrical connectors (e.g., electrical connector 250) described herein. The button assembly 1202 additionally includes a seal 1214 that is similar to the seals (e.g., seal 214) described herein.

Figure 13:
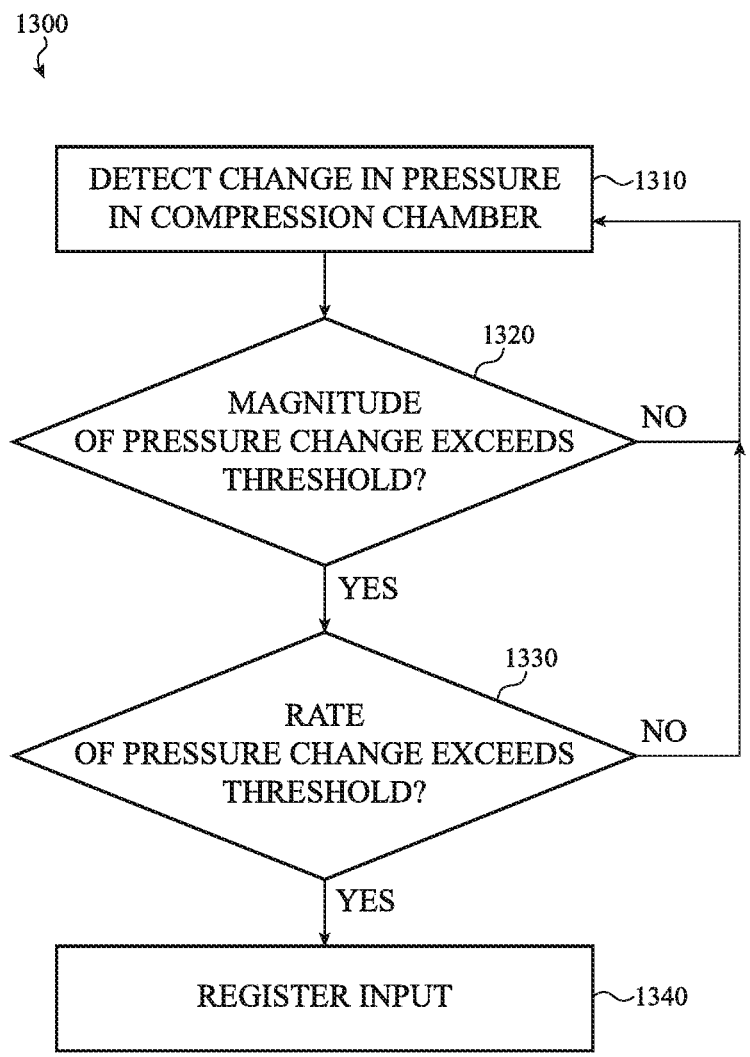
FIG. 13 is a simplified flow chart depicting example operations of a processor of an electronic device with a button assembly as described herein.

FIG. 13 is a simplified flow chart depicting example operations of a processor of an electronic device with a button assembly as described herein. The method 1300 may be used to determine whether a change in pressure in a compression chamber is registered or detected as an input by the electronic device. In addition to the pressure in the compression chamber changing based on a change in the volume of the compression chamber as discussed above, in various embodiments, the pressure in a compression chamber may change based on factors that are not a result of a user input, such as changes in temperature, atmospheric pressure, and the like. A processor of the electronic device can determine, based on characteristics of a pressure change, whether a change in pressure is a result of a user input.

The method 1300 includes operation 1310 in which a pressure sensor detects a change in pressure in a compression chamber. Next, at operation 1320, a processor of the electronic device determines whether the magnitude of the change in pressure exceeds a threshold. If the magnitude of the change in pressure does not exceed the threshold, then the process returns to operation 1310 and pauses until another change in pressure is detected. If the pressure change does exceed the threshold, then the process proceeds to operation 1330, in which the processor determines whether the rate of the change in pressure exceeds a threshold. If the rate of the change in pressure does not exceed the threshold, then the process returns to operation 1310 and pauses until another change in pressure is detected. If the rate of the change in pressure does exceed the threshold, then the process proceeds to operation 1340 in which the processor registers an input.

The processor of the electronic device may process the input and may trigger various actions at the electronic device responsive to receiving the input. For example, the processor may execute computer-readable instructions such as performing operations within applications, an operating system, a user interface, and the like.

In various embodiments, the steps of method 1300 are performed in a different order or with more or fewer steps. For example, in one embodiment, one or more of operations 1320 and 1330 may be omitted from the method.

As noted above, many embodiments described herein reference a force-sensing input device for use as part of an electronic device. It may be appreciated, however, that this is merely one example; other configurations, implementations, and constructions are contemplated in view of the various principles and methods of operation—and reasonable alternatives thereto—described in reference to the embodiments described above.

For example, without limitation, a force-sensing input device can be additionally or alternatively associated with: a display surface, a housing or enclosure surface, a planar surface, a curved surface, an electrically conductive surface, an electrically insulating surface, a rigid surface, a flexible surface, a key cap surface, a trackpad surface, a display surface, and so on. The interface surface can be a front surface, a back surface, a sidewall surface, or any suitable surface of an electronic device or electronic device accessory. Typically, the interface surface of a multimode force interface is an exterior surface of the associated portable electronic device but this may not be required.

Further, although many embodiments reference a force-sensing input device in a portable electronic device (such as a cell phone or tablet computer) it may be appreciated that a force-sensing input device can be incorporated into any suitable electronic device, system, or accessory including but not limited to: portable electronic devices (e.g., battery-powered, wirelessly powered devices, tethered devices, and so on); stationary electronic devices; control devices (e.g., home automation devices, industrial automation devices, aeronautical or terrestrial vehicle control devices, and so on); personal computing devices (e.g., cellular devices, tablet devices, laptop devices, desktop devices, and so on); wearable devices (e.g., implanted devices, wrist-worn devices, eyeglass devices, and so on); accessory devices (e.g., protective covers such as keyboard covers for tablet computers, stylus input devices, charging devices, and so on); and so on.

Although specific electronic devices are shown in the figures and described herein, the force-sensing input devices described herein may be used with various electronic devices, mechanical devices, electromechanical devices and so on. Examples of such include, but are not limited to, mobile phones, personal digital assistants, time keeping devices, health monitoring devices, wearable electronic devices, input devices (e.g., a stylus, trackpads, buttons, switches, and so on), a desktop computer, electronic glasses, steering wheels, dashboards, bands for a wearable electronic device, and so on. Although various electronic devices are mentioned, the force-sensing input devices disclosed herein may also be used in conjunction with other products and combined with various materials.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
   a device housing;
   a display coupled to the device housing and configured to display a graphical output; and
   a button assembly at least partially disposed in the device housing, the button assembly comprising:
   an input member configured to move in response to receiving an input;
   a compression chamber defining a sealed volume that is sealed from an external environment; and
   a pressure sensor operably coupled to the compression chamber and configured to detect a pressure within the compression chamber; wherein:
   movement of the input member changes a volume of the compression chamber, thereby changing the pressure within the compression chamber;
   the pressure sensor is configured to output a signal in response to the pressure changing within the compression chamber; and
   the signal causes the graphical output of the display to change.

2. The electronic device of claim 1, wherein:
   the button assembly further comprises a shaft operably coupled to the input member and extending into the compression chamber; and
   the shaft is configured to move in response to the input member moving, thereby changing the volume of the compression chamber.

3. The electronic device of claim 1, wherein the input member is configured to at least one of rotate or translate.

4. The electronic device of claim 1, wherein:
   the electronic device is an electronic watch; and
   the input member is configured to rotate and translate.

5. The electronic device of claim 1, wherein the button assembly further comprises:
   a reference chamber; and
   the pressure sensor is configured to determine a differential pressure between the compression chamber and the reference chamber.

6. The electronic device of claim 1, wherein the button assembly further comprises a pressure change actuator configured to change the pressure within the compression chamber, thereby providing tactile output through the input member.

7. The electronic device of claim 1, wherein the button assembly further comprises a valve configured to couple the compression chamber with a reference chamber, the valve further configured to equalize the pressure in the compression chamber with a pressure in the reference chamber.

8. The electronic device of claim 1, wherein the button assembly further comprises a seal configured to provide an airtight seal of the compression chamber.

9. The electronic device of claim 1, wherein the button assembly comprises a touch sensor.

10. An electronic device comprising:
    a device housing;
    a display coupled to the device housing;
    a button housing at least partially disposed in the device housing and defining an opening;
    an input member;
    a shaft coupled to the input member and extending through the opening;
    a seal positioned in the opening and compressed between the shaft and a surface of the button housing;

a compression chamber coupled to the opening and having a sealed volume configured to contain a fluid; and a pressure sensor coupled to the compression chamber and configured to detect a change in a pressure within the compression chamber in response to movement of the shaft.

11. The electronic device of claim 10, wherein:

the shaft has a generally cylindrical shape;

the seal is an o-ring seal disposed around the shaft;

the shaft comprises a collar configured to retain the shaft in the opening;

the button housing comprises a flange for attaching the button housing to the device housing of the electronic device; and the electronic device further comprises an electrical connector configured to couple the pressure sensor to a processor of the electronic device.

12. The electronic device of claim 10, wherein:

the electronic device further comprises a reference chamber coupled to the pressure sensor; and the pressure sensor is a differential pressure sensor configured to detect a difference between the pressure within the compression chamber and a pressure within the reference chamber.

13. The electronic device of claim 10, wherein the compression chamber is positioned in at least one of the input member, the button housing, or the device housing of the electronic device.

14. The electronic device of claim 10, wherein:

the button housing is attached to the device housing of the electronic device; and the button housing and the device housing cooperatively define at least a part of the compression chamber.

15. The electronic device of claim 10, wherein:

the shaft is a first shaft and coupled to the input member near a first end;

the compression chamber is a first compression chamber;

the pressure is a first pressure;

the pressure sensor is a first pressure sensor; and the electronic device further comprises:

a second shaft coupled to the input member near a second end;

a second compression chamber having a second volume that changes based on a position of the second shaft; and a second pressure sensor coupled to the second compression chamber and configured to detect a change in a second pressure within the second compression chamber in response to movement of the second shaft.

16. The electronic device of claim 10, further comprising a flexible membrane positioned below the shaft.

17. The electronic device of claim 10, wherein the shaft is threaded.

18. A method for detecting an input at a button of an electronic device, the method comprising:

detecting, using a pressure sensor, a pressure change of a material contained within a sealed volume of a compression chamber due to movement of the button;

determining that a magnitude of the pressure change exceeds a first threshold;

in response to determining that the magnitude of the pressure change exceeds the first threshold, determining whether a rate of the pressure change exceeds a second threshold; and in response to determining that the rate of the pressure change exceeds the second threshold, registering an input at the electronic device.

19. The method of claim 18, wherein detecting the pressure change comprises comparing a pressure within the compression chamber to a pressure within a reference chamber of the button.

20. The method of claim 18, wherein a graphical output of a display of the electronic device changes in response to registering the input.

* * * * *